United States Patent [19]
Ishikawa et al.

[11] Patent Number: 6,019,808
[45] Date of Patent: Feb. 1, 2000

[54] AIR CLEANER

[75] Inventors: Tominori Ishikawa; Yuji Toyama; Masayuki Terano, all of Niigata; Yoshihiro Takada, Ibaraki; Keiichi Honma, Niigata, all of Japan

[73] Assignee: Hitachi, Ltd., Tokyo, Japan

[21] Appl. No.: 09/097,591

[22] Filed: Jun. 16, 1998

[30] Foreign Application Priority Data

Jun. 20, 1997 [JP] Japan ..................................... 9-164256

[51] Int. Cl.⁷ .................................................. B01D 46/00
[52] U.S. Cl. ............................. 55/320; 55/385.2; 55/471
[58] Field of Search ............................. 55/467, 471, 472, 55/385.2, 320, 332; 484/187

[56] References Cited

U.S. PATENT DOCUMENTS

| | | | |
|---|---|---|---|
| 4,560,395 | 12/1985 | Davis ....................................... | 55/385.2 |
| 5,053,065 | 10/1991 | Garay et al. ............................ | 55/385.2 |
| 5,141,540 | 8/1992 | Helmus .................................... | 55/385.2 |
| 5,167,681 | 12/1992 | O'Keefe et al. ......................... | 55/385.2 |
| 5,462,484 | 10/1995 | Jung et al. .............................. | 55/385.2 |
| 5,470,363 | 11/1995 | Leader et al. ........................... | 55/385.2 |
| 5,733,348 | 3/1998 | Skarsten .................................. | 55/385.2 |

*Primary Examiner*—Duane S. Smith
*Attorney, Agent, or Firm*—Antonelli, Terry, Stout & Kraus, LLP

[57] ABSTRACT

An air cleaner of the present invention includes a housing having an upper wall and side walls, a fan, a supporting plate extending between the two side walls for supporting the fan, a first air flow directional member extending between the supporting plate and the upper wall, and a second air flow directional member provided at a horizontal periphery of the housing. The first air flow directional member not only provides reinforcement to the supporting plate and the upper wall, but also directs an air flow output from the fan. The second air flow directional member has a horizontal plate and vertical plates for directing air flow at the horizontal periphery of the housing. The first air flow directional member and the second air flow directional member are adapted to equalize a velocity of an air flow distributed across an air flow output area of the fan unit. The supporting plate and the first air flow directional member are adapted to maintain a predetermined spacing between a predetermined portion of the fan and the first air flow directional member. The air cleaner of the present invention can reduce energy consumption by improving efficient of the fan.

19 Claims, 12 Drawing Sheets

FIG. 9A
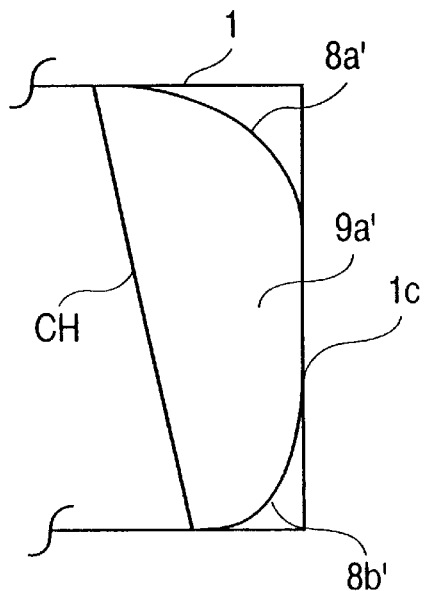
FIG. 9B
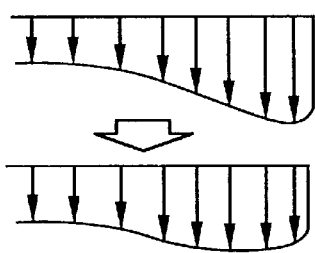
FIG. 9C
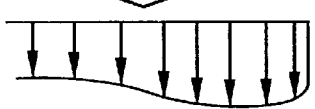
FIG. 10A    FIG. 10B   FIG. 10C
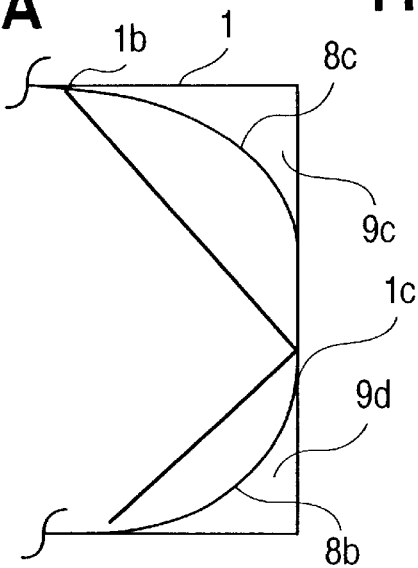 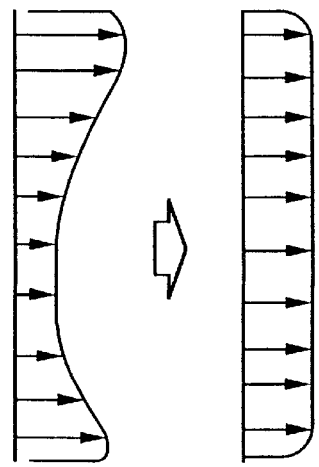

DISTANCE OF GAP BETWEEN THE EXTERNAL CIRCUMFERENCE OF FAN AND SUPPORTING PLATE (mm)

AIR CLEANER

BACKGROUND OF THE INVENTION

1. Technical Field of the Invention

The present invention generally relates to an air cleaner, and more specifically, relates to an air cleaner installed within a ceiling of a clean room used for manufacturing elements or devices such as semiconductor or liquid crystal arrangements.

2. Description of Related Art

A construction of an air cleaner in a related art will be explained referring to FIGS. 13–15. The air cleaner D in the related art has a fan F, a filter 5 and a housing 1 for accommodating the fan F and the filter 5 as shown in FIG. 13. The fan F includes a vane wheel 2, a motor 3 to rotate the vane wheel 2. A motor base 4 supports the motor 3 in the housing 1. The housing 1 has an air inlet 6a at its upper plate 1a, and has an opening at its bottom portion for installing the filter 5. A pressurizing chamber P is formed inside the housing 1 in an upper stream side of the filter 5.

The vanewheel 2 is directly connected to a rotational shaft of the motor 3, and driven rotatively by the motor 3 so as to take in air from the air inlet 6a. When the vanewheel 2 rotates, the air from the air inlet 6a is sucked through a sucking port 2b of the vanewheel 2 and is blown out from a blowing port 2c of the vanewheel 2. The air blown out from the blowing port 2c is supplied to the pressurizing chamber P for increasing a static pressure thereof and is then supplied to the filter 5. The filter 5 purifies the air by removing such small particles having diameters as small as 0.1 micrometers. At the air inlet 6a, a bell mouth 6 is provided on the opposite side of the sucking port 2b in order to smooth a flow of the air which is sucked.

Since this kind of air cleaner is installed within the ceiling, it is designed to have a light weight to make its installation easy. For this reason, the housing 1 is generally formed by thin metal sheet. As one potential problem, sometimes an inspection or a maintenance is performed from an upper side of the air cleaners after they are installed, I.e. via a space provided above the ceiling. In this case, when a worker steps e.g., inadvertently on an upper plate of the air cleaner, the upper plate 1a is likely to be disadvantageously deflected or deformed (i.e., bent) by the weight of the worker. In the related art, the motor base 4 is fixed to the housing in such a manner that the motor base 4 is disposed in parallel to, and independently of, the upper plate 1a. When the worker steps on the upper plate 1a, the upper plate 1a is deflected or deformed inward, while the vane wheel 2 attached on the motor base 4 through the motor 3 stays in a same position. Consequently, the bell mouth 6 on the upper plate 1a and the vane wheel 2 disadvantageously have a gap therebetween narrowed, and in a worst case, the bell mouth 6 and the vanewheel 2 contact each other. Further, narrowing the gap between the bell mouth 6 and the vane wheel 2 increases a pressure loss between the air inlet 6a and the blowing port 2a, 2c, resulting in a deterioration of fan efficiency and an increase of noise level. Further, when the bell mouth 6 and the vanewheel 2 contact each other, mechanical locking of the motor 3 and/or destruction of the vanewheel 2 can occur.

Another problem in the related art is explained with reference to FIGS. 14 and 15. More particularly, as shown in FIGS. 14 and 15, the air 12 blown out of the fan F makes a rotational flow 14 within a horizontal plane which includes the blowing port 2c of the fan F in the pressurizing chamber P, such lengthening an air flow path from the blowing port 2c to the filter 5 and resulting in an increase of a pressure loss. In addition, since each corner of the pressurizing chamber P is formed to have substantially right angle, a vortex flow 13 is formed within such corners by an air turbulence, which deteriorates the efficiency of the blow by increasing static pressure loss.

For example, Japanese Utility Model Application Laid-Open No. HEI 5-63619 discloses an air cleaner of above type. In such related art, air (indicated by an arrow in FIG. 1 thereof) is blown out from the fan 4 and also makes a rotational flow within the horizontal plane including the blowing port 7, 8 of the fan 4 in the pressurizing chamber 6. The rotational flow is forced to flow downward guided by an inner surface of a vertical wall of the pressurizing chamber 6. A guide piece 6' is disposed at a lower portion of the vertical wall so as to guide the air flow along the vertical wall toward a central portion of the panel filter 1. In this related art, the air blown out of the fan 4 also makes a rotational flow within the horizontal plane including the blowing port of the fan 4 in the pressurizing chamber, since the pressurising chamber has a similar construction to that of the related art. This arrangement also has such problems as increasing static pressure loss by a lengthened air flow path and by a formation of a vortex flow.

Further shown in the present FIG. 13 is a related art member 100 which is sometimes provided next to the motor base 4. However, such member 100 is of insufficient thickness/rigidity to provide any support to the motor base 4. Further, such member 100 does not extend between the motor base 4 and upper wall 1a, and therefore does not provide support to the upper wall 1a.

SUMMARY OF THE INVENTION

It is therefore an object of the present invention to solve the problems of the related art explained above. In view of the objective of solving the problems explained above, the construction of the air cleaner of the present invention includes a housing having an upper wall and side walls, a fan, a supporting plate in a form of a substantially horizontal platform extending substantially between at least two side walls of said housing for supporting said fan, wherein an air flow from said fan is introduced into a fan area defined between said supporting plate and said upper wall, at least one first air flow directional member extending between said supporting plate and said upper wall providing reinforcement to at least one of said supporting plate and said upper wall, and further directing an air flow output from the fan area, and at least one second air flow directional member provided at a horizontal periphery of said housing, said second air flow directional member having a substantially horizontal plate and substantially vertical plate for directing air flow at the horizontal periphery of said housing, wherein said first air flow directional member and said second air flow directional member are adapted to substantially equalize a velocity of an air flow distributed across an air flow output area of said fan unit.

In another embodiment, the air cleaner comprises a housing having an upper wall and side walls, a fan, a supporting plate in a form of a substantially horizontal platform extending substantially between at least two side walls of said housing for supporting said fan, wherein an air flow from said fan is introduced into a fan area defined between said supporting plate and said upper wall, at least one first air flow directional member extending between said supporting plate and said upper wall providing reinforcement to at least one of said supporting plate and said upper wall, and further directing an air flow output from the fan area, and at least one second air flow directional member provided at a horizontal periphery of said housing, said second air flow directional member having a substantially horizontal plate and substantially vertical plate for directing air flow at the horizontal periphery of said housing, wherein said supporting plate and said first air flow directional member are adapted to maintain a predetermined spacing between a predetermined portion of said fan and said first air flow directional member.

In a third embodiment, the air cleaner comprises a housing having an upper wall and side walls, an air filter mounted with respect to said housing, a fan, a supporting plate in a form of a substantially horizontal platform extending substantially between at least two side walls of said housing for supporting said fan, wherein an air flow from said fan is introduced into a fan area defined between said supporting plate and said upper wall, at least one first air flow directional member extending between said supporting plate and said upper wall providing reinforcement to at least one of said supporting plate and said upper wall directing an air flow output from the fan area, wherein said first air flow directional member and said supporting plate are adapted to provide reinforcement to said upper wall of said housing, and at least one second air flow directional member provided at a horizontal periphery of said housing, said second air flow directional member having a substantially horizontal plate disposed between said upper plate and a lower limit of said housing for defining an air flow directional area between said horizontal plate and said upper plate and further having a substantially vertical plate at at least one corner of said housing, for directing air flow at the horizontal periphery of said housing, wherein said first air flow directional member and said second air flow directional member are adapted to substantially equalize a velocity of an air flow distributed across an air flow output area of said air filter of said air cleaner unit.

In yet an additional embodiment, the air cleaner comprises a housing having an upper wall and side walls, an air filter mounted with respect to said housing, a fan, a supporting plate in a form of a substantially horizontal platform extending substantially between at least two side walls of said housing for supporting said fan, wherein an air flow from said fan is introduced into a fan area defined between said supporting plate and said upper wall, at least one first air flow directional member extending between said supporting plate and said upper wall providing reinforcement to at least one of said supporting plate and said upper wall directing an air flow output from the fan area, wherein said first air flow directional member and said supporting plate are adapted to provide reinforcement to said upper wall of said housing, and at least one second air flow directional member provided at a horizontal periphery of said housing, said second air flow directional member having a substantially horizontal plate disposed between said upper plate and a lower limit of said housing for defining an air flow directional area between said horizontal plate and said upper plate and further having a substantially vertical plate at at least one corner of said housing, for directing air flow at the horizontal periphery of said housing, wherein said supporting plate and said first air flow directional member are adapted to maintain a predetermined spacing between a portion of said fan and said first air flow directional member.

As explained above, since a first air flow directional member extending between the supporting plate and the upper wall provides reinforcement to at least one of the supporting plate and the upper wall, even if a worker inadvertently steps on the upper wall of the air cleaner, the upper wall is prevented from being defleced or deformed (i.e., bent) by the weight of the worker. Thus, the positional relationship between the bell mouth and the fan can advantageously be kept substantially constant, which prevents the gap between the bell mouth from being narrowed, thus resulting in avoiding deterioration of fan efficiency, increase of noise level and such troubles as mechanical locking of the motor or destruction of the vanewheel.

In addition, since the second air flow directional member is provided at a horizontal periphery of said housing, and has a substantially horizontal plate and substantially vertical plate for directing air flow at the horizontal periphery of said housing, the air cleaner of the present invention can substantially equalize a velocity of an air flow distributed across an air flow output area of the fan unit. Further, a pressure loss is reduced because the air flows smoothly from the outlet of the fan to the filter without forming vortex flows at any corner of the housing, which improves efficiency of the blower and reduces energy consumption.

BRIEF DESCRIPTION OF THE DRAWINGS

FIG. 9A shows a plan view of an exemplary second air flow directional member including a horizontal plate, FIG. 9B shows a distribution of air flow velocity along the side wall without such horizontal plate, and FIG. 9C shows a distribution of air flow velocity along the side wall with the horizontal plate.

FIG. 10A shows a plan view of another second air flow directional member including horizontal plates, FIG. 10B shows a distribution of air flow velocity along the vertical wall without such horizontal plates, and FIG. 10C shows a distribution of air flow velocity along the vertical wall with the horizontal plates.

DETAILED DESCRIPTION OF THE PREFERRED EMBODIMENTS OF THE INVENTION

Figure 1:
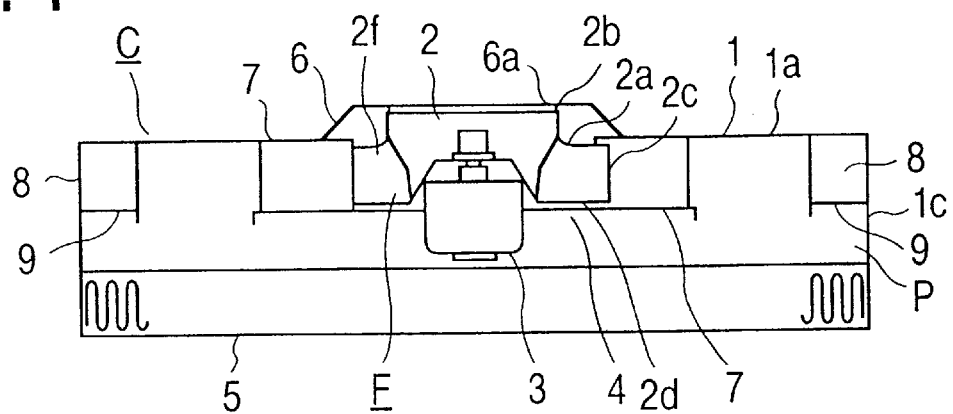
FIG. 1 shows a cross-sectional view of an air cleaner in one embodiment of the present invention.
Figure 2:
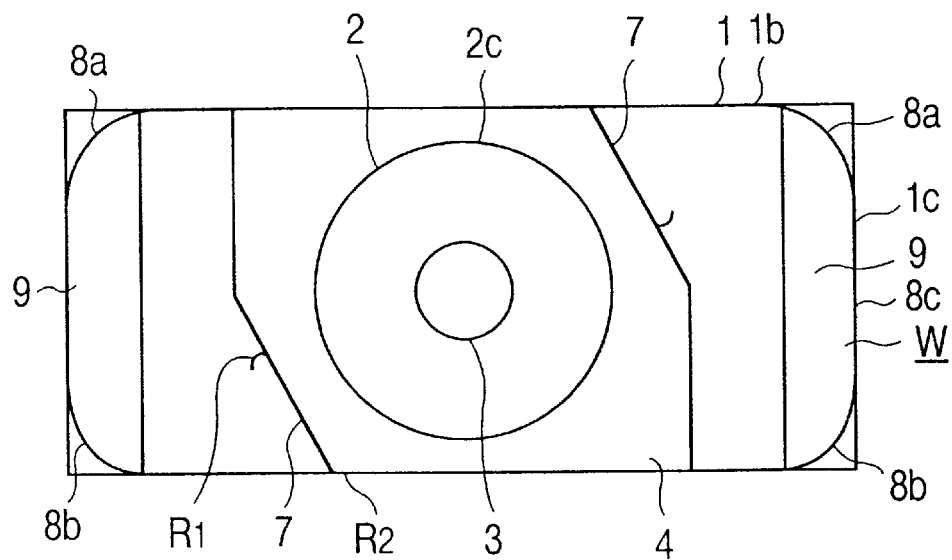
FIG. 2 shows a plan view of the air cleaner in one embodiment of the present invention.
Figure 3:
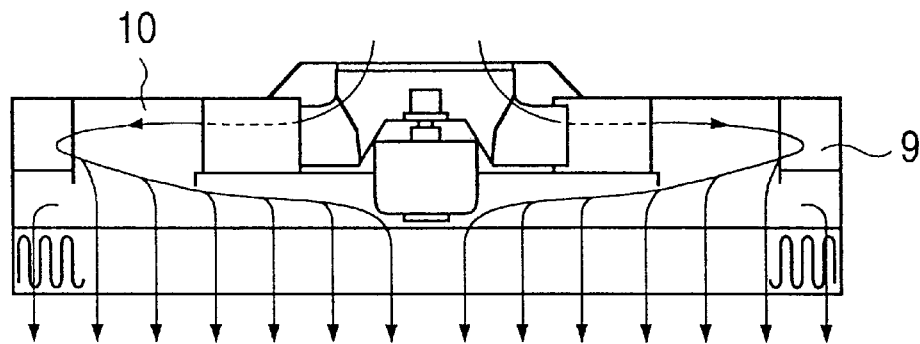
FIG. 3 shows a cross-sectional view of an air flow of the air cleaner in one embodiment of the present invention.

The preferred embodiments of the present invention will now be explained with reference to FIGS. 1 to 12 and FIGS. 16 to 19. As disclosed in FIG. 1, an air cleaner C in this embodiment has a fan F, a filter 5 and a housing 1 for accommodating the fan F and the filter 5. The fan F includes a van wheel 2, and a motor 3 to rotate the vane wheel 2. A motor base 4, configured as a supporting plate, supports the motor 3 in the housing 1. The housing 1 has an upper wall 1a, side walls 1b and an opening at its bottom portion for installing the filter 5. The housing 1 has an air inlet 6a formed at its upper wall 1a. A pressurizing chamber P is formed at the upper stream side of the filter 5 within the housing 1.

The vanewheel 2 is directly connected to a rotational shaft 3e (FIG. 16) of the motor 3, and is driven to rotate by the motor 3 so as to take in air from the air inlet 6a. When the vanewheel 2 rotates, the air from the air inlet 6a is sucked through a sucking port 2b of the vanewheel 2 and is blown out from a blowing port 2c of the vanewheel 2. An air flow from the fan F is introduced into a fan area defined between the motor base 4 and the upper wall 1a. The air is supplied to the pressurizing chamber P via the fan area for increasing a static pressure thereof and is then supplied to the filter 5. The filter 5 purifies the air by removing small particles such as having diameters as small as 0.1 micrometers. Usually, an ULPA (Ultra Low Penetration Air) filter or a HEPA (High Efficiency Particulate Air) filter is used as the filter 5 when a high cleanliness level is required. At the air inlet 6a, a bell mouth 6 is provided facing the sucking port 2b in order to smooth a flow of the air to be sucked.

Figure 6:
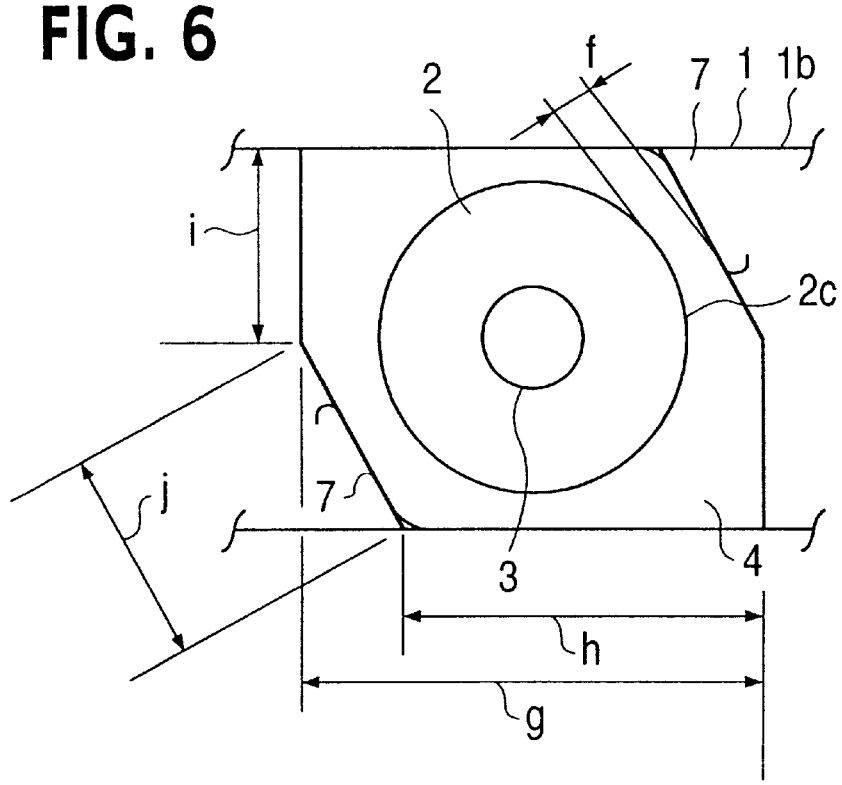
FIG. 6 shows a plan view of one essential portion of the air cleaner is one embodiment of the present invention.
Figure 12:
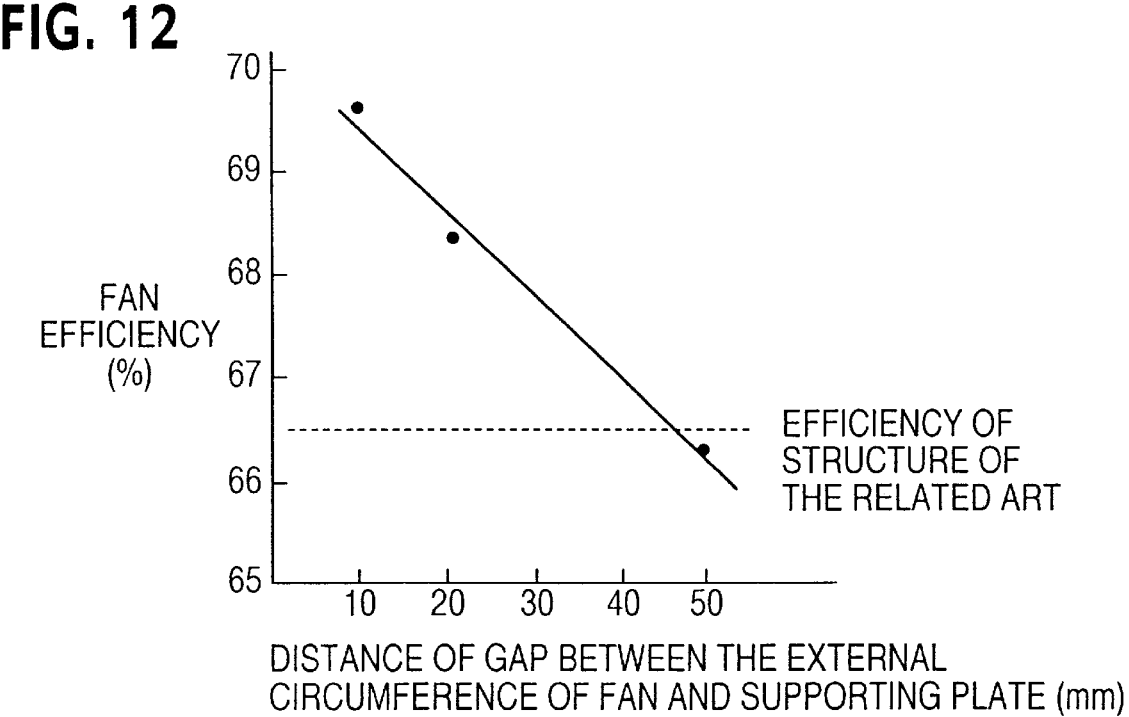
FIG. 12 is a diagram showing a relationship between the supporting plate and size of external circumference of the vane wheel in the air cleaner in one embodiment.
Figure 13:
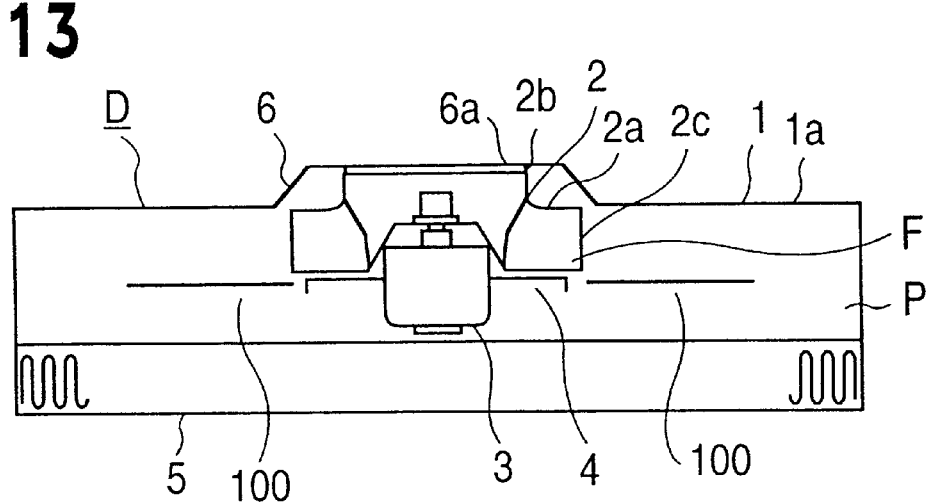
FIG. 13 shows a cross-sectional view of a related art air cleaner.
Figure 14:
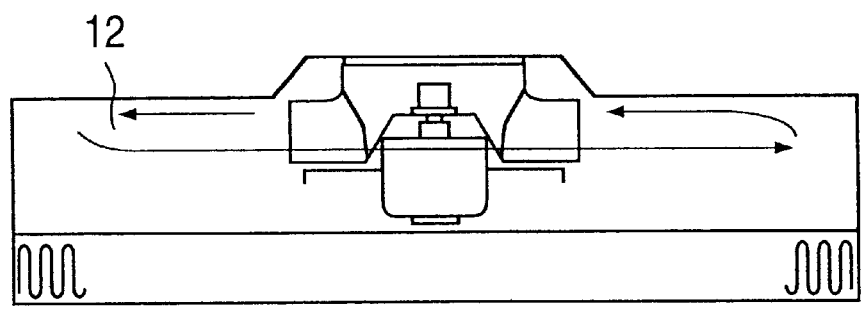
FIG. 14 shows a cross-sectional view of an air flow in the housing of the related art air cleaner.
Figure 15:
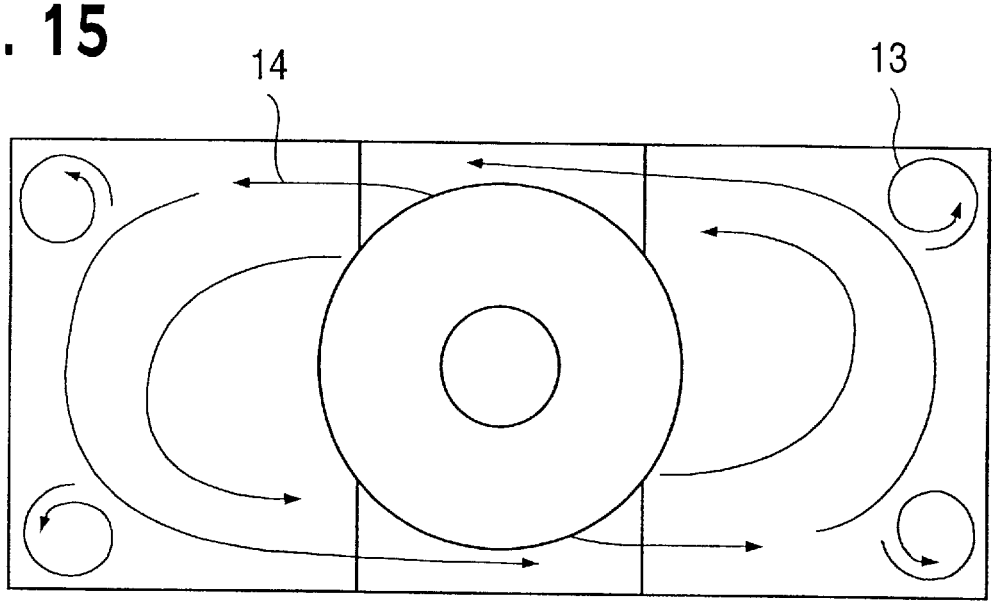
FIG. 15 shows a plan view of an air flow in the housing of the related art air cleaner.

The air cleaner C in this embodiment also has guide plates 7, acting as first air flow directional members, and being provided vertical between the upper wall 1a and motor base 4. The guide plates 7 also connect the motor base 4 and the upper wall 1a so as to provide rigid reinforcement to the housing 1. In one preferred configuration, the motor base 4 has a hexagonal shape, and a pair of guide plates 7 are disposed in diagonal positions with one end R2 being connected to the side wall. The other end R1 of the guide plate 7 is disposed to be spaced a predetermined distance f from an outer periphery of the vanewheel 2 as shown in FIG. 6. This distance f is determined in relation to a desired characteristic of the fan F. As shown in FIG. 12, fan efficiency decreases when the vanewheel/plate distance f increases. Approximately 69.5% of efficiency is achieved using a distance of 10 mm, and decreases to approximately 66% at the distance of 50 mm. As one preferred example, the vanewheel 2 has an external diameter of 350 mm, is driven to rotate at 950 RPM, and the distance f is set to 45 mm or less, preferably to 10 mm, which is a sufficient range so as not to be in contact with the external circumference of the vanewheel 2. By setting the distance f to 45 mm or less, the fan efficiency can be improved in comparison with the related art as shown in FIG. 12.

In a preferred embodiment, the overall housing 1 has a major length of 576 mm, a minor length of 1176 mm, and a height of 298 mm. Further, as illustrated in FIG. 6, a major length "g" of a preferred motor base 4 is 460 mm, a sub-major length "h" is 363 mm, a sub-minor length "i" is 252 mm, and a guide plate length "j" is 308 mm. These dimensions are decided so as to be a little smaller than that of a lattice-type ceiling frame, where the air cleaner is installed (a major length: 600 mm, a minor length: 1200 mm) in order to escape a space for suspending apparatus of the lattice-type frame.

In this embodiment the other end R1 preferably has a curl so as to guide an air flow from the vanewheel smoothly without inducing a turbulent flow.

In order to guide an air flow smoothly along the side wall within the fan area and ultimately to the pressurizing chamber P, it is desirable to form a curved surface at the end R2 of the guide plate 7. The guide plate 7 thus directs an air flow output from the fan area to the pressurizing chamber P. The guide plate 7 is fixed to the sidewall 1b, the upper wall 1a and the motor base 4 tightly and securely not only for reinforcing the housing 1 but also for preventing an air leak therebetween. The motor base 4 and guide plate 7 are of sufficient thickness and rigidity so as to provide rigid mechanical support to the upper wall 1a. That is, the motor base 4 must be sufficiently supported by other components (e.g., at least two side walls) within the housing 1 and of a sufficient thickness, and the guide plate 7 must also be of a sufficient supporting thickness, so as to support the upper wall 1a and/or maintain a predetermined spacing between the guide plate 7 and vanewheel 2, even when a predetermined weight (e.g., a human weight) is inadvertently applied to the upper wall 1a. An exemplary thickness of the motor base 4 is 1.6 mm (usually designed within the range of 1.2–2.3 mm), and an exemplary thickness of the guide plate 7 is 0.8 mm (usually designed within the range of 0.6–1.2 mm).

In each end of the pressurizing chamber P, a second air flow directional member w having a substantially horizontal plate 9 is disposed at a predetermined intermediate position between the upper wall 1a and a lower limit of the housing 1 for defining an air flow directional area between the horizontal plate 9 and the upper wall 1a. The second air flow directional member also has a substantially vertical plate 8 at at least one corner of the housing 1. The vertical plates 8 have recessed curved surfaces 8a, 8b corresponding somewhat to a circular circumference of the fan F. A radius of the curvature of each of the curved surfaces 8a, 8b is decided to be similar to, or preferably to be identical to, that of the fan F. A flat plane 8c is disposed between the curved surfaces 8a and 8b. Usually, the flat plane 8c is a part of the vertical wall 1c of the housing 1. However, the flat plane 8c can be formed as a part of a semi-circular strip including curved surfaces 8a, 8b at its ends.

Figure 5:
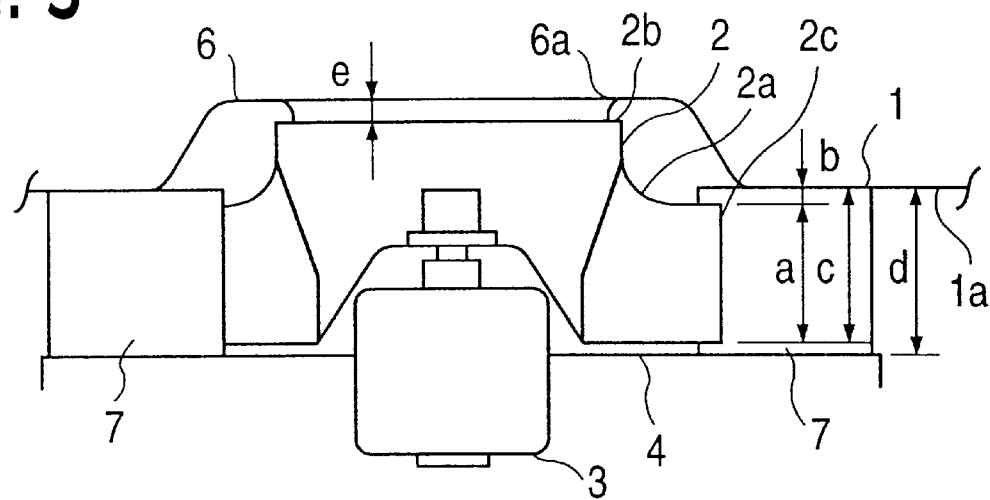
FIG. 5 shows a cross-sectional view of one essential portion of the air cleaner in one embodiment of the present invention.

The horizontal plate 9 is formed in a semi-circular shape in accordance with the curved surfaces 8a, 8b and the flat plate 8c within the air flow direction area. In this embodiment, the semi-circular shape means a shape including curved portions corresponding to the curved surfaces 8a, 8b at its both ends, and includes a linear portion corresponding to the flat plate 8c between the curved portions. The horizontal plate 9 may be formed in a semi-circular shape originally and be fixed to the lower ends of the curved surfaces 8a, 8b and the flat plane 8c. Alternatively, the horizontal plate 9 can be formed in a substantially rectangular strip and can be fixed at least to the lower edge of curved surfaces 8a, 8b. The horizontal plate 9 is fixed to the vertical plate 8 tightly and securely for not only reinforcing the housing 1, but also for preventing an air leak therebetween. As shown in FIG. 5, since the size d between the motor base 4 and the upper wall 1a is kept constant by the guide plate 7, the size b between the upper blowing port 2a of the vanewheel 2 and the upper wall 1a of the housing 1 and the size e between the sucking port 2b of the vanewheel 2 and the bell mouth 6 are also kept constant, even if the upper wall 1a is inadvertently deformed or deflected.

Figure 4:
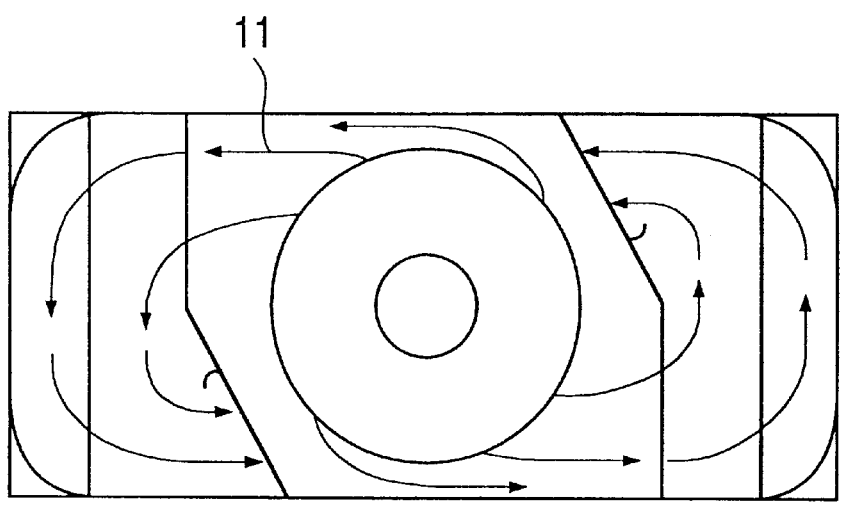
FIG. 4 shows a plan view of an air flow of the air cleaner in one embodiment of the present invention.

In this embodiment, since the second air flow directional member directs the air blown out from the fan f smoothly along the surface of its vertical plate 8, an air turbulence or vortex flow is prevented from occurring at the corners of the housing (see FIG. 4). The performance of the fan F can thus be prevented from deterioration. In addition, since the first air flow directional member stops the rotational flow within the horizontal plane including the blowing port 2c of the fan F, and forces the air flow 10, 11 towards the filter 5 as disclosed in FIGS. 3 and 4. Thereby, a dynamic pressure of the air flow is effectively and efficiently converted into a static pressure in the pressurizing chamber P, which enables this advantageous arrangement to equalize pressure over almost all of the filter 5. Thus air is blown out and downward in a similar speed or in a similar velocity from every part of the filter 5. Thus, the blown out air from filter end portions (right end or left end) has a similar velocity to that blown out from a mid portion of the blowing port of the air cleaner, which prevents turbulent flow from being induced due to any difference of the air flow velocity. This enables improvement of the performance of the air cleaner.

As far as the positional relationship between the guide plate 7 and motor base 4 can be maintained, the construction of the motor base 4 may be either one of an integrated (one-piece) construction or a separated construction, depending on the manufacturing technology and cost.

Figure 7:
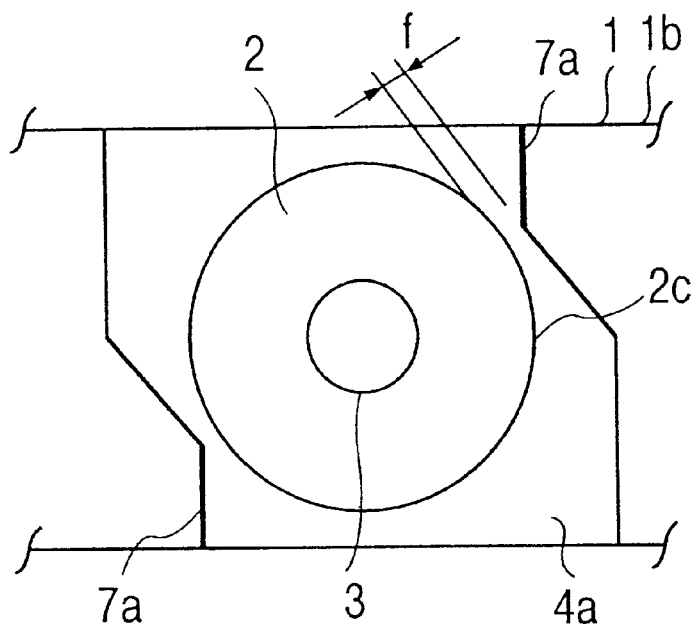
FIG. 7 shows a first variation of a motor base in one embodiment of the present invention.
Figure 8:
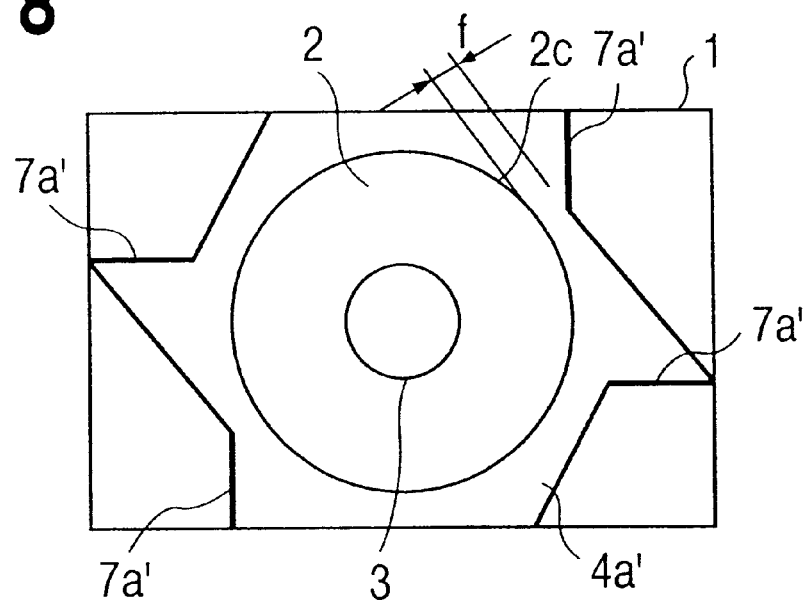
FIG. 8 shows a second variation of the motor base in one embodiment of the present invention.

The present invention is not limited to the embodiment explained above and allows various modification examples. For example, exemplary variations of the shape of the motor base 4 are shown in FIGS. 7 and 8. FIG. 7 shows a first variation of the motor base 4, in which an S-shaped motor base 4a is provided within the housing 1, and a couple of guide plates 7a are disposed at diagonal positions thereof. FIG. 8 shows a second variation of the motor base 4, in which a star-shaped motor base 4a' is provided within the housing 1 and four guide plates 7a' are provided at diagonal positions thereof. In either of these variations, the guide plates 7 are provided on suitable portions of the motor bases 4a, 4a', such that generation of rotational flow of air can be prevented effectively.

Variations of the shape of the second air flow directional member w are shown in FIGS. 9A–C, 10A–C and FIG. 11.

More particularly, FIG. 9A shows a plan view of the second air flow directional member w, FIG. 9B shows a distribution of air flow velocity along the side wall 1b without such a horizontal plate 9a', and FIG. 9C shows a distribution of air flow velocity along the side wall 1b with the FIG. 9A horizontal plate 9a'.

In this first variation as disclosed in FIG. 9A, the horizontal plate 9a' is formed in a kind of semi-circular shape with a chord side CH thereof disposed slantly against the vertical wall 1c. The curved surfaces 8a', 8b' are formed in different sizes so as to have different radii depending on a length of each of curved surfaces 8a', 8b'. This variation is effective to equalize the air flow velocity at the blowing port of the air cleaner, when the air flow velocity at the end portion of the blowing port (in FIG. 9B, right end is disclosed) is larger than that in the mid portion of the blowing port as shown in FIG. 9B. By disposing the horizontal plate 9a' slantly against the vertical wall 1c and elongating the curved surface 8a', an air flow flowing into the end portion of the blowing port decreases, which equalize the air flow velocity as shown in FIG. 9C.

FIG. 10A shows a second variation of the second air flow directional member w, FIG. 10B shows a distribution of an air flow velocity along the vertical wall 1c without such horizontal plates 9c, 9d, and FIG. 10C shows a distribution of an air flow velocity along the vertical wall 1c with the horizontal plates 9c, 9d. In the second variation, the second air flow directional member w is divided into two pieces, one with horizontal plate 9c and the other with horizontal plate 9d. The horizontal plates 9c and 9d have triangle shapes. As disclosed in FIG. 10A, curved surface 8c is elongated and has a longer arc than curved surface 8b. A triangle forming the horizontal plate 9c is larger than that forming the horizontal plate 9d. The longest side of each horizontal plates 9c, 9d is disposed slantly against the vertical wall 1c. The curved surfaces 8b, 8c are formed in different sizes so as to have different radii depending on a length of each of curved surfaces 8b, 8c. This variation is effective equalize the air flow velocity at the blowing port of the air cleaner, when the air flow velocities at the side portions of the blowing port (in FIG. 10B, upper side and lower side) are larger than that in the mid portion of the blowing port as shown in FIG. 10B. By disposing the horizontal plates 9c and 9d slantly against the vertical wall 1c and elongating the curved surface 8c, the air flow flowing into the side portions of the blowing port decreases, which equalizes the air flow velocity as shown in FIG. 10C. In this variation, since the air flow velocity at the FIG. 10B upper side is larger than that at the FIG. 10B lower side, the curved surface 8c (on the FIG. 10A upper side) is elongated (in comparison to the curved surface provided at the lower side) so as to decrease the air flow velocity effectively. If the air flow velocity at the FIG. 10B lower side were to be larger than that at the FIG. 10B upper side, then the curved surface 8b (on the lower side) would be elongated.

Figure 11:
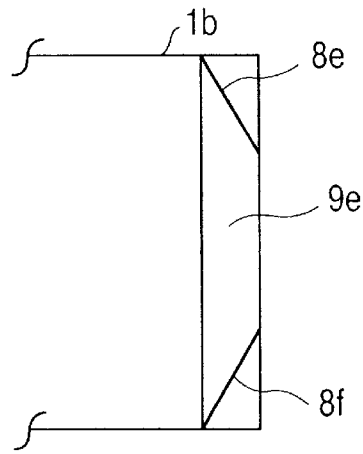
FIG. 11 shows a third variation of the second air flow directional member in one embodiment of the present invention.

FIG. 11 shows a third simplistic variation of the second air flow directional member w. In this variation, curved surfaces are approximated by a couple of linear plates 8e and 8f. A horizontal plate 9e is formed in a trapezoidal shape or rectangular shape, with its longer side disposed in parallel to the vertical side wall 1c. Since a construction of the second air flow directional member w is simplified, manufacturing cost can be reduced using such embodiment.

In the above-described embodiments of the invention, since a smooth air flow is formed at the corners of pressurizing chamber, and a distribution of air flow velocity is improved, an air cleaner capable of providing clean air with less energy is obtained.

Figure 16:
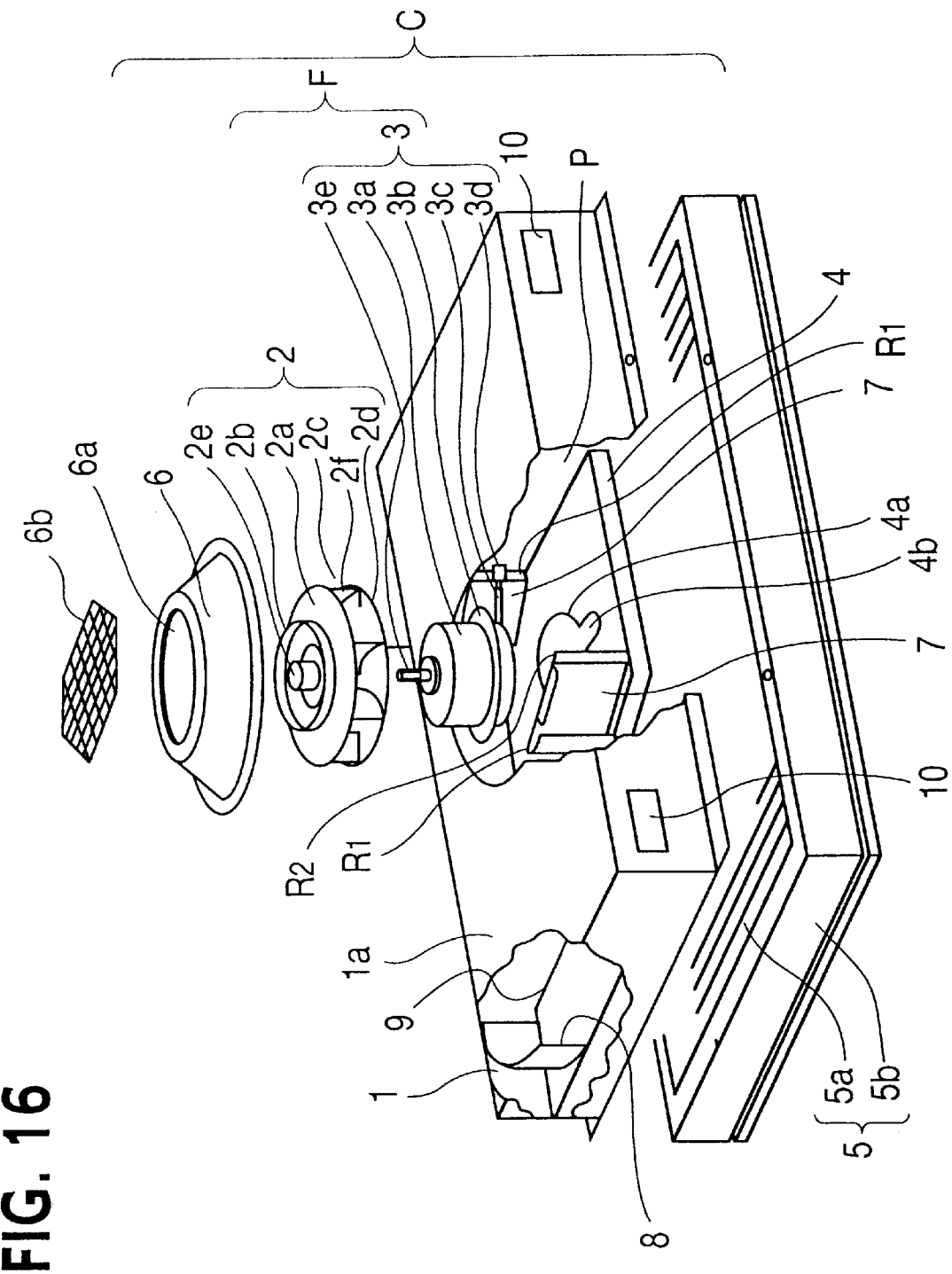
FIG. 16 shows a perspective exploded view of an air cleaner in one embodiment of the present invention.
Figure 17:
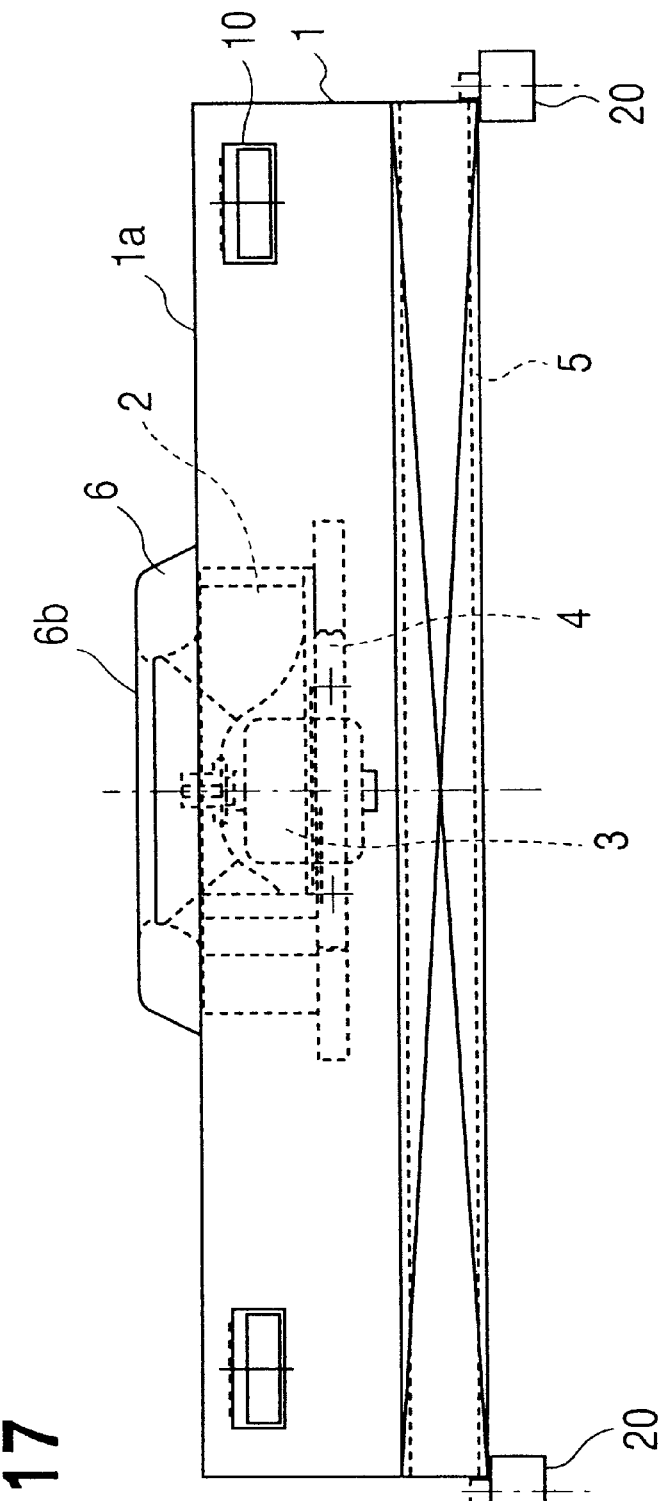
FIG. 17 shows a front view of an air cleaner in one embodiment of the present invention.
Figure 18:
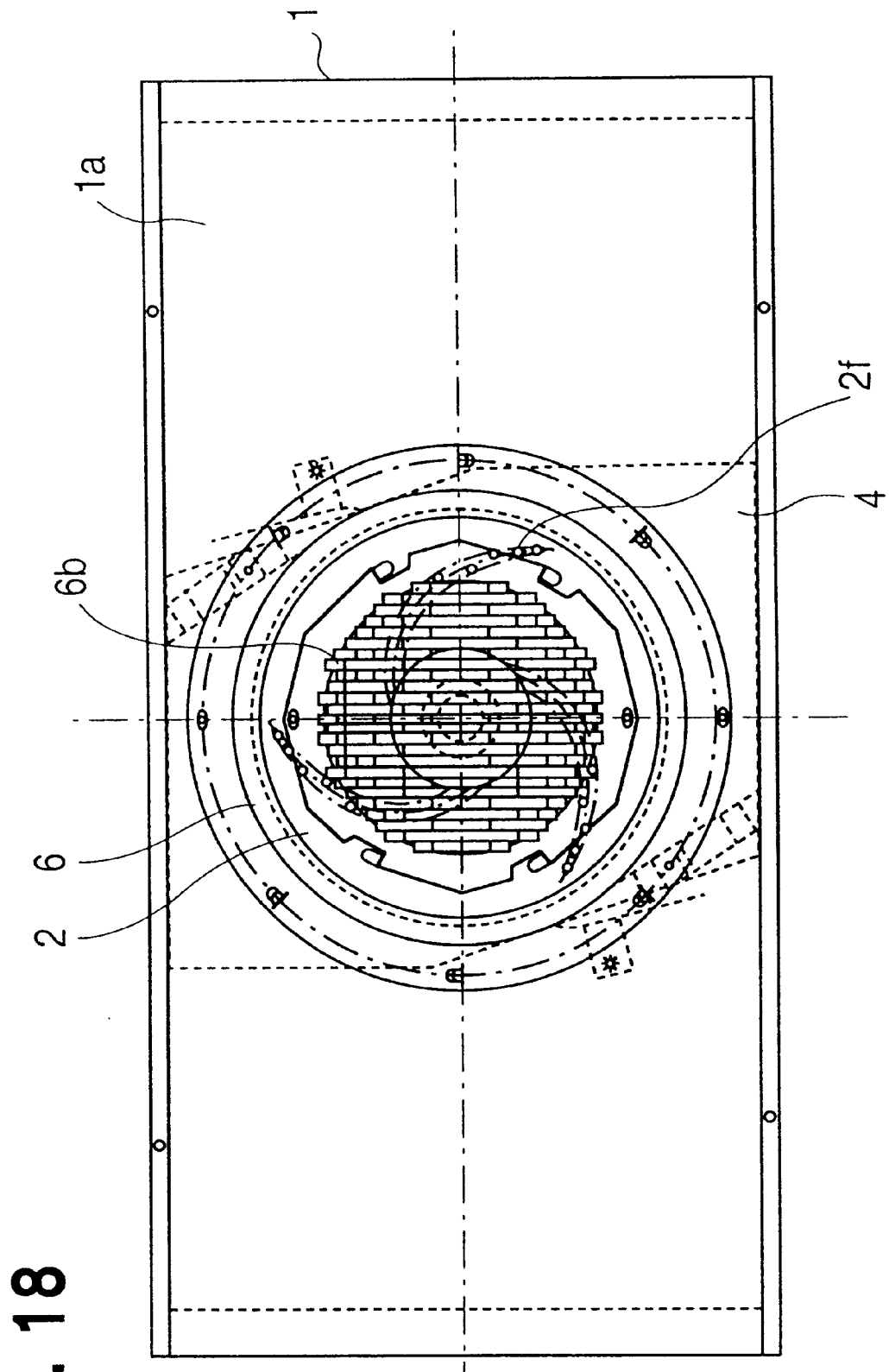
FIG. 18 shows a plan view of an air cleaner in one embodiment of the present invention.
Figure 19:
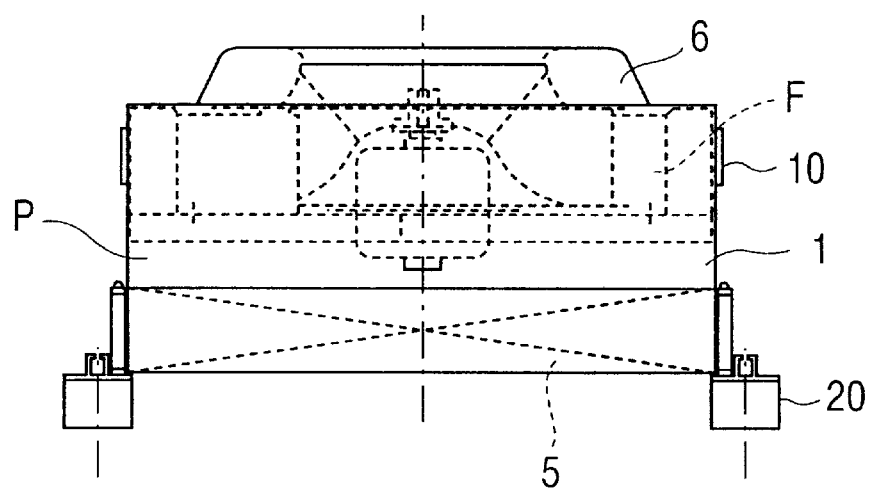
FIG. 19 shows a side view of an air cleaner in one embodiment of the present invention.

A more detailed construction of a preferred embodiment is now explained referring to FIG. 16 through FIG. 19. More particularly, FIG. 16 shows a perspective exploded view of the air cleaner of this embodiment. Some parts are depicted disassembled and/or cut-away view to show their details. A front view, a plan view, and a side view are shown in FIGS. 17, 18, 19 respectively. Fan F includes a vanewheel 2 and a motor 3. The vanewheel 2 includes a shroud 2a, a base plate 2d, a plurality of blades 2f and a boss 2e. The shroud 2a is formed in a disc shape, and a sucking port 2b is formed at its center. The base plate 2d is also formed in a disc shape and has substantially the same diameter as the shroud 2a. The blades 2f are fixed between the shroud 2a and the base plate 2d. Blowing ports 2c are formed between the shroud 2a and the base plate 2d and between the adjacent blades 2f. The boss 2e is fixed to the base plate 2d at its rotational center.

FIG. 5's dimension "a" represents a h eight of blowing ports 2c, dimension "b" represents a vanewheel/upperwall spacing, dimension "c" represents an upper-wall-to-lower-vanewheel spacing, and dimension "d" represents an upper-wall-to-motor-base spacing. In a preferred embodiment, such dimensions are as follows: A: 88 mm, b: 0–5 mm (preferably 0 mm), c: 88–103 mm, d: 105 mm. The motor 3 includes a housing 3a containing a coil, a stator and a rotor therein, an output shaft 3e which is a part of the rotor, electric cords 3c for supplying electricity to the coil, a connector 3d for connecting the cord 3c to an electric power line. The housing 3a has a flange 3b for installing the motor 3 to the motor base 4. The motor 3 and the vanewheel 2 is assembled into the fan F by fixing the output shaft 3e to the boss 2e. The motor base 4 has a hole 4a for accommodating installation of the motor 3. The hole 4a has a recessed portion 4b for leading out the cord 3c. The motor 3 is installed in such a manner that an end portion of the housing 3a which is an opposite end to that with the output shaft 3e is inserted into the hole 4a, and the flange 3b is butted against the upper surface of the motor base 4. The flange 3b is fixed to the motor base with any suitable attachments, e.g., bolts and nuts or screws. The motor base 4 is formed in a hexagonal shape and has a pair of guide plates 7 at diagonal positions. The motor base 4 is fixed within a housing 1, e.g., is attached to at least two side walls of the housing 1. The guide plates 7 are placed between the motor base 4 and an upper wall 1a of the housing 1 for reinforcement of the upper wall 1a, and for improvement of air flow.

A fan area is defined between the upper wall 1a and the motor base 4. Each of the guide plates 7 has curved or curled ends R1 and R2 to smooth the air flow within the fan area. The upper wall 1a has a hole to install the fan F from an upper side. This hole has a larger diameter than that of the fan F, and a bell mouth 6 is installed so as to cover the hole. The bell mouth 6 has an air inlet 6a, having a protection net 6b disposed at the air inlet 6a. The protection net is made of a metal net, an expanded metal or a plastic net.

The housing 1 has a pressurizing chamber P inside, and has an opening at its bottom for installing a filter 5. The filter 5 includes a filter element 5a and a filter frame 5b. The filter 5 is installed to the opening of the housing by fixing the filter frame 5b to the lower part of the housing. A pair of second air flow directional members are disposed at the right end and the left end of the housing 1 (not disclosed in FIGS. 16–19). Four handles 10 are disposed on the outer surface of the housing 1. Each handle 10 is disposed adjacent to each corner on longitudinal sides of the housing 1. This air cleaner C is installed within a ceiling of a clean room. Usually, this kind of air cleaner C is installed on a lattice-type frame 20 as disclosed in FIGS. 17 and 19. In this case, the lower edge of the filter frame 5b is mounted on the upper surface of the lattice-type frame 20. A gasket or sealing material is disposed between the lower edge of the filter frame 5b and the upper surface of the lattice-type frame 20.

As explained above in detail, according to the present invention, even if a worker steps on the upper wall of the housing, the positional relationship between the bell mouth and fan can be kept constant by the rigid guide plates. The guide plates also prevent a rotational flow within the pressurizing chamber, and urge the air flow toward the filter. In addition, curved surfaces disposed at the corners prevent generation of vortex flows or air turbulences at the corners by guiding the air flow smoothly, which reduces resultant static pressure loss.

Thus, there is provided an air cleaner capable of improving efficiency of the fan, thereby, reducing energy consumption.

What is claimed is:

1. A fan unit adapted for use with an air cleaner, comprising:
   a housing having an upper wall and side walls;
   a fan;
   a supporting plate in a form of a substantially horizontal platform extending substantially between at least two side walls of said housing for supporting said fan, said supporting plate having at least six sides along a periphery thereof, wherein an air flow from said fan is introduced into a fan area defined between said supporting plate and said upper wall;
   at least one air flow directional member extending between said supporting plate and said upper pall providing reinforcement to at least one of said supporting plate and said upper wall, and further directing an air flow output from the fan area; and
   at least one second air flow directional member provided at a horizontal periphery of said housing, said second air flow directional member having a substantially horizontal plate and substantially vertical plate for directing air flow at the horizontal periphery of said housing;
   wherein said first air flow direction member and said second air flow direction member are adapted to substantially equalize a velocity of an air flow distributed across an air flow output area of said fan unit.

2. A fan unit adapted for use with an air cleaner, comprising:
   a housing having an upper wall and side walls;
   a fan;
   a supporting plate in a form of a substantially horizontal platform extending substantially between at least two side walls of said housing for supporting said fan, said supporting plate having at least six sides along a periphery thereof, wherein an air flow from said fan is introduced into a fan area defined between said supporting plate and said upper wall;
   at least one first air flow directional member extending between said supporting plate and said upper wall providing reinforcement to at least one of said supporting plate and said upper wall, and further directing an air flow output from the fan area; and
   at least one second air flow directional member provided at a horizontal periphery of said housing, said second air flow directional member having a substantially horizontal plate and substantially vertical plate for direction air flow at the horizontal periphery of said housing;
   wherein said supporting plate and said first air flow directional member are adapted to maintain a predetermined spacing between a predetermined portion of said fan and said first air flow directional member.

3. An air cleaner unit, comprising;
   a housing having an upper wall and side walls;
   an air filter mounted with respect to said housing;
   a fan;
   a supporting plate in a form of a substantially horizontal platform extending substantially between at least two side walls of said housing for supporting said fan, said supporting plate having at least six sides along a periphery thereof, wherein an air flow from said fan is introduced into a fan area defined between said supporting plate and said upper wall;

at least one first air flow directional member extending between said supporting plate and said upper wall, for directing an air flow output from the fan area, wherein said first air flow directional member and said supporting plate are adapted to provide reinforcement to said upper wall of said housing; and at least one second air flow directional member provided at a horizontal periphery of said housing, said second air flow directional member having a substantially horizontal plate disposed at a predetermined position between said upper plate and a lower limit of said housing for defining an air flow directional area between said horizontal plate and said upper plate and further having a substantially vertical plate at at least one corner of said housing, for directing air flow at the horizontal periphery of said housing;

wherein said first air flow directional member and said second air flow directional member are adapted to substantially equalize a velocity of an air flow distributed across an air flow output area of said air filter of said air cleaner unit.

4. An air cleaner unit, comprising:

a housing having an upper wall and side walls;

an air filter mounted with respect to said housing;

a fan;

a supporting plate in a form of a substantially horizontal platform extending substantially between at least two side walls of said housing for supporting said fan, said supporting plate having at least six sides along a periphery thereof, wherein an air flow from said fan is introduced into a fan area defined between said supporting plate and said upper wall;

at least one first air flow directional member extending between said supporting plate and said upper wall for directing an air flow output from the fan area, wherein said first air flow directional member and said supporting plate are adapted to provide reinforcement to said upper wall of said housing; and at least one second air flow directional member provided at a horizontal periphery of said housing, said second air flow directional member having a substantially horizontal plate disposed at a predetermined position between said upper plate and a lower limit of said housing for defining an air flow directional area between said horizontal plate and said upper plate and further having a substantially vertical plate at at least one corner of said housing, for directing air flow at the horizontal periphery of said housing;

wherein said supporting plate and said first air flow directional member are adapted to maintain a predetermined spacing between a predetermined portion of said fan and said first air flow directional member.

5. An air cleaner according to claim 3, wherein said fan is a turbo fan and is disposed at a substantially center of the housing.

6. An air cleaner according to claim 3, wherein said fan is a turbo fan and said supporting plate is wider than outer diameter of said fan.

7. An air cleaner according to claim 6, wherein a couple of said first air flow directional members are disposed at a predetermined distance from an outer periphery of said turbo fan.

8. An air cleaner according to claim 6, wherein two pairs of said first air flow directional members are disposed at a predetermined distance from an outer periphery of said turbo fan.

9. A fan unit adapted for use with an air cleaner, comprising:

a housing having an upper wall and side walls;

a fan;

means for supporting said fan from a bottom side of said fan and being supported substantially from at least two side walls of said housing, and for directing an air flow introduced into a fan area defined between said means for supporting and said upper wall said means for supporting having at least six sides along a periphery thereof;

at least one first means between said means for supporting and said upper wall for providing reinforcement to at least one of said means for supporting and said upper wall, and for directing an air flow output from the fan area; and at least one second means at a horizontal periphery of said housing for directing air flow at the horizontal periphery of said housing;

wherein said first means and said second means are adapted to substantially equalize a velocity of an air flow distributed across an air flow output area of said fan unit.

10. A fan unit as claimed in claim 1, wherein said supporting plate is hexagonal having six sides along a periphery thereof.

11. A fan unit as claimed in claim 2, wherein said supporting plate is hexagonal having six sides along a periphery thereof.

12. An air cleaner unit as claimed in claim 3, wherein said supporting plate is hexagonal having six sides along a periphery thereof.

13. An air cleaner unit as claimed in claim 1, wherein said supporting plate is hexagonal having six sides along a periphery thereof.

14. A fan unit as claimed in claim 9, wherein said supporting plate is hexagonal having six sides along a periphery thereof.

15. A fan unit as claimed in claim 1, wherein said supporting plate is star-shaped.

16. A fan unit as claimed in claim 2, wherein said supporting plate is star-shaped.

17. An air cleaner unit as claimed in claim 3, wherein said supporting plate is star-shaped.

18. An air cleaner unit as claimed in claim 4, wherein said supporting plate is star-shaped.

19. A fan unit as claimed in claim 9, wherein said supporting plate is star-shaped.

* * * * *